United States Patent
Krämer et al.

(10) Patent No.: US 7,117,760 B2
(45) Date of Patent: Oct. 10, 2006

(54) SUPPORT ARRANGEMENT FOR PIVOTABLE SUPPORT OF A SHIFT LEVER

(75) Inventors: Klaus Krämer, Baudenbach (DE); Susanne Pintus, Herzogenaurach (DE)

(73) Assignee: INA-Schaeffler KG, Herzogenaurach (DE)

( * ) Notice: Subject to any disclaimer, the term of this patent is extended or adjusted under 35 U.S.C. 154(b) by 74 days.

(21) Appl. No.: 10/352,671

(22) Filed: Jan. 28, 2003

(65) Prior Publication Data

US 2003/0164056 A1    Sep. 4, 2003

Related U.S. Application Data

(60) Provisional application No. 60/353,555, filed on Jan. 31, 2002.

(30) Foreign Application Priority Data

Feb. 2, 2002    (DE)    ................. 102 04 282

(51) Int. Cl.
    *F16H 59/04*    (2006.01)
(52) U.S. Cl. ................. 74/473.33; 74/473.25; 74/473.28
(58) Field of Classification Search ............. 74/473.21, 74/473.24, 473.25, 473.27, 473.33
See application file for complete search history.

(56) References Cited

U.S. PATENT DOCUMENTS

| | | | | |
|---|---|---|---|---|
| 2,529,741 A | * | 11/1950 | Roberts | ................. 74/473.33 |
| 3,677,105 A | * | 7/1972 | Dence | ................. 74/473.21 |
| 3,934,485 A | * | 1/1976 | Ratliff | ................. 74/473.33 |
| 4,018,099 A | * | 4/1977 | O'Brien et al. | ........... 74/473.21 |
| 4,875,383 A | * | 10/1989 | Holman et al. | ........... 74/473.33 |
| 5,036,721 A | | 8/1991 | Gugin | |
| 5,050,449 A | | 9/1991 | Falcou et al. | |
| 5,950,493 A | * | 9/1999 | Pritchard | ................. 74/473.33 |
| 6,026,702 A | | 2/2000 | Dreier et al. | |
| 6,230,579 B1 | | 5/2001 | Reasoner et al. | |
| 6,308,814 B1 | | 10/2001 | Ikegami | |
| 6,325,196 B1 | | 12/2001 | Beattie et al. | |
| 6,494,111 B1 | * | 12/2002 | Lee | ................. 74/473.27 |

FOREIGN PATENT DOCUMENTS

| | | |
|---|---|---|
| DE | 31 25 632 C1 | 12/1982 |
| DE | 31 36 923 C1 | 1/1983 |
| DE | 41 10 012 C1 | 5/1992 |
| DE | 690 04 303 T2 | 2/1994 |
| DE | 43 09 861 C1 | 10/1994 |
| DE | 195 44 837 A1 | 6/1996 |
| DE | 197 23 507 A1 | 1/1999 |
| DE | 199 01 056 A1 | 8/1999 |
| DE | 199 18 509 A1 | 12/2000 |
| DE | 100 51 381 A1 | 5/2001 |
| DE | 100 15 079 A1 | 10/2001 |
| JP | 2001-125318 | 5/2001 |
| JP | 2001-206094 | 7/2001 |

* cited by examiner

*Primary Examiner*—William C. Joyce
(74) *Attorney, Agent, or Firm*—Volpe and Koenig, P.C.

(57) ABSTRACT

A bearing arrangement (1) for pivotable mounting of a shift lever (2) by a casing (10) in a housing (3) that provides a tilt axis (9a) and a pivot axis (8a) for the shift lever (2). The tilt axis (9a) and the pivot axis (8a) are mutually spaced apart.

27 Claims, 11 Drawing Sheets

SUPPORT ARRANGEMENT FOR PIVOTABLE SUPPORT OF A SHIFT LEVER

CROSS-REFERENCE TO RELATED APPLICATIONS

This application claims the benefit of U.S. Provisional Application No. 60/353,555 filed Jan. 31, 2002, which is incorporated herein by reference as if fully set forth.

AREA OF THE INVENTION

The invention relates to a support arrangement for pivotable support of a shift lever by means of a casing in a housing, the support arrangement pivotably supporting the shift lever in the casing around a pivot axis with respect to the casing, and also pivotably supporting the shift lever together with the casing with respect to the housing around a tilt axis, and wherein the shift lever has at a free end, a shift finger which is pivotable around both the tilt axis and the pivot axis.

BACKGROUND OF THE INVENTION

DE 43 09 861 C1 describes a shift arrangement for shifting gears by means of a shift lever. One or two selectively shiftable gears situated on a gearshaft are respectively allocated to a shift plane. Several gears can be shifted by means of the shifting device. At least a gear, or at most two drive wheels, are allocated to a shift plane. Each gear can be shifted only in its predetermined shift plane.

The shift lever is pivotably arranged by means of a support arrangement with respect to a housing. The support arrangement makes possible pivoting movements of the shift lever in a selection plane and in a shift plane aligned transversely of the selection plane. During the selection and shifting processes, the shift lever is guided by a slide.

The shift lever is in a neutral position in the selection plane and is selectively pivotable out of the neutral position into one of at least two inoperative positions in the selection plane by the selection of shift planes. If the shift lever is in one of the inoperative positions, a shift plane is selected. The shift lever is pivotable into a shift position out of the inoperative position in the shift plane for shifting one of the gears. The neutral position of the shift lever is for the most part also one of the inoperative positions, from which one of two gears is selectively shiftable.

In the inoperative positions or in the neutral position of the shift lever, selector shafts are in a middle, neutral position, in which the gears shiftable by means of the selector shafts are not shifted. The shift lever is provided with a shift finger at a free end. Each of the selector shafts has an engagement groove or a shift opening for the engagement of the shift finger. A selective engagement in one of at least two axially parallel selector shafts is effected by selection movements of the shift lever. The shift lever in these positions is movably coupled to one of the selector shafts.

A pivoting of the shift lever in the shift plane from the inoperative position in one or other direction results in a displacement of the selector shaft coupled to the shift lever, since the shift finger acts on a side bounding the engagement groove. One of the gears allocated to the selector shafts is engaged by the displacement of the selector shaft.

The shift lever described in DE 31 25 632 is pivotably received by means of a universal joint with respect to a housing fixed to the vehicle. This joint or this support arrangement provides a box-shaped casing. The casing receives the shift lever and is supported, for pivoting by means of the shift lever, around a tilt axis directed transversely of the pivot axis. The tilt axis is aligned with the middle axis of selectively one or two pivot studs. The pivot studs support the casing, pivotably on the housing in the selection plane, however not in the shift plane. The shift lever is pivotable in the selection plane, immovable in the casing, and pivotable with the casing around the tilt axis. In a selection movement on the shift finger, the shift lever pivoting around the tilt axis takes the casing with it. The shift finger is arranged on the shift lever on the opposite side of the tilt axis from the shift grip (shift knob), and with the shift lever, pivots around the tilt axis in the selection plane.

The support arrangement furthermore provides for a pivotable support of the shift lever in the shift plane around a pivot axis in the casing. The pivot axis runs transversely of the tilt axis. The pivot axis is at the same time the middle axis of a pivot stud arranged in the casing. The shift lever is supported on the casing around the pivot stud in the shift plane, however not in the selection plane. The shift finger is arranged at the opposite end of the shift lever to the pivot axis, also supported pivotably in the shift plane, but not in the selection plane, around the pivot axis. The pivot axis and the tilt axis are situated so that they intersect in a common plane.

This solution, while generally satisfactory, has the disadvantage that because the pivot axis and tilt axis of the shift lever are situated in one plane, limits are set on the adjustment of shift forces and shift paths. "Shift forces" are to be understood as the forces which can be perceptible by the operator on applying force (on shift knob) when the operator selects and shifts gears. The shift lever travels over a path defined on its point of force application when selecting and shifting. Thus each further point on the lever between the point of force application and the pivot or tilt axis travels a path defined by its distance from the axes. The path, for the most part in radian measure, is dependent on the distance of the shift knob to the axes. With the same pivot angle of the shift lever around the tilt axis or pivot axis, each of the points, independently of whether it is swiveled around the tilt axis or pivot axis, travels the same path. The shift lever is frequently guided by a shift slide located between the point of force application and the axes. The design of slides which save material and space is often limited because of the same path of the shift lever in the slide for selection and shift movements. The shift forces on the shift knob can be affected by the lever ratio of the shift lever. The lever ratio results from the distance of the knob from the axes and the distance of the axes from the engagement of the shift finger in the engagement groove of the selector shaft. Limits are as a rule set on the length of the shift lever projecting into the passenger space, conditioned by constructional space. The length of the shift finger, starting from the crossed axes, is dependent on the position of the elements of the internal shift setup adjoining the shift lever.

On selecting the shift plane and on shifting the gears, the pivoting shift lever is guided by means of guide tracks, e.g., a slide. The pivoting movements of the shift lever in the selection and shift directions are limited by stops. The stops ensure that the shift finger after the conclusion of selection engages a shift plane exactly in one of the engagement grooves of one of the selector shafts. The stops which limit the shift path of the shift finger ensure that the selector shaft is displaced exactly into its predetermined position and not beyond it.

Only one gear can be shifted during a shift process. If two gears are allocated to a shift plane, one of the gears in the shift plane cannot be shifted from the outset or is locked in the shift plane by means of a locking device, while the other is shifted. According to the design of the shift device, the further shift planes adjacent to the selected shift plane are locked against inadvertent or automatic selection. A false selection or shift is to be excluded. The gears in the shift planes adjacent to the selected shift plane are locked against inadvertent or automatic shifting during the shift of a gear and when the gear is engaged. The reverse gear is as a rule locked against inadvertent selection or shift from one of the shift positions or selection positions for shift or selection of the forward gears.

Other devices provide for a device for a perceptible increase of the shift force on the shift lever. The device is allocated to the shift plane of the reverse gear. The operator is informed, by means of the markedly rising shift force on selection of the shift plane for the reverse gear, that he is about to engage the reverse gear. The operator's perception of the position of the shift lever relative to the gears is thereby facilitated. The signal given to the operator with increasing selection force is in particular used to warn the operator of inadvertent changing out of a shift plane for the forward gears into the shift plane for the reverse gear. This so-called "crash stop" is effective on inadvertent selection and also on intentional selection of the shift plane for the reverse gear. A brief jump in selection force on the lever signals the change. The selection force is for a moment substantially higher than the forces which occur at the shift knob on selection of the shift planes for the forward gears. After the increased selection force is overcome, the actuating force falls again to a normal level.

SUMMARY OF THE INVENTION

The invention therefore has as its object to provide a support arrangement for a shift lever of a shift device pivotable in two planes, by which the above-mentioned disadvantages are avoided and which is simple to produce, and also with which the cost of assembly of a shift device actuating the selector shafts is reduced.

This object is attained according to the subject of the characterizing portion of claim 1 in that the tilt axis and the shift axis run mutually spaced apart.

The casing is pivotably supported on a housing fixed to the vehicle, for pivoting by means of the shift lever around a tilt axis directed transversely of the pivot axis. The tilt axis was aligned with the middle axis of selectively one or two pivot studs. The pivot studs support the casing on the housing, pivotably in the selection plane but not in the shift plane. The shift lever is immovable with respect to the casing in the selection plane, and is pivotable with the casing around the tilt axis. Upon a selection movement on the shift finger, the shift lever pivoting around the tilt axis takes the casing with it. The shift finger is arranged on a side facing away with respect to the shift engagement, preferably on the opposite side, of the tilt axis on the shift lever, and pivots around the tilt axis with the shift lever in the selection plane.

In the device according to the invention, the engagement grooves in the middle neutral position of the selector shafts are aligned in a line with respect to one another in the selection directions. The shift finger can pivot unhindered through the engagement grooves in the selection plane, until the inoperative position of the shift lever is reached and the shift lever engages in one of the engagement grooves.

The support arrangement furthermore provides for the pivotable support of the shift lever in the shift plane around a pivot axis in the casing. The pivot axis runs transversely of the tilt axis. The pivot axis is aligned with the centers of two opposed support eyelets in the casing, or selectively with one support eyelet formed in the casing. The shift lever is thus mounted on the casing for pivoting in the shift plane around a pivot stud supported in the support eyelet(s), but not in the selection plane. The shift knob and the shift finger respectively face away in another direction from the pivot axis. Upon shift movements, the shift lever is movably coupled by the shift finger to one of the engagement grooves of a selector shaft. The shift movement effects the displacement of the selector shaft. The shift finger here acts on a side of the engagement groove situated in the displacement direction of the selector shaft. One of the gears allocated to the selector shaft is engaged by the displacement of the selector shaft.

The pivot axis and the tilt axis are according to the invention situated horizontally on different planes, and vertically, according to the design of the support arrangement, in a common plane or in different planes. The pivot axis and the tilt axis are then situated between the point of force application on the shift knob and the shift finger. Pivoting movements around the axis situated nearest to the shift finger result, on the shift knob and also on each of the points of the shift lever adjoining the shift knob in the direction of this axis, in a longer path in radian measure, when the shift device limits both the selection and the shift movements to the same pivot angle. It is thus provided by the design of the device that the axis situated nearest to the shift finger is the pivot axis. The tilt axis is situated more remote from the shift finger. Under the precondition that the pivoting region of the shift lever is limited to the same pivot angle in selection and in shifting, the shift knob travels a longer path on shifting the gears in comparison to selection. Alternatively, it is provided that the tilt axis is situated nearer to the shift finger in comparison to the position of the pivot axis. Under this precondition, the shift finger travels a longer path on selection of the shift planes, in comparison to shifting.

With an embodiment of the invention, it is provided that the pivot stud is non-rotatably received in the housing. The casing is pivotable around the pivot stud. A slide bearing is arranged between the pivot stud and the casing in each of the support eyelets of the casing. Alternatively thereto, the pivot stud is seated fitting exactly into the support eyelet of the casing, without a special bearing. The shift lever is either mounted pivotably around the pivot stud immovably fixed to the casing, or the pivot stud is seated fixedly in the shift lever and moves in support eyelets of the casing. Alternatively, the supports of the shift lever on the pivot studs or the supports of the pivot stud in the casing are provided with slide bearings.

In further embodiments of the invention, it is provided that the stops limiting the pivot angle of the shift lever in the selection and shift directions are integrated into the support arrangement. The pivot angle of the shift movements of the shift lever are limited on the casing by means of at least one slotted hole, in which a stop projecting from the shift lever engages. The slotted hole is formed curved and extending in the pivoting direction of the shift lever when shifting one of the gears. Alternatively thereto, the shift lever has a recess machined out like a slotted hole, in which a stop formed on the casing engages. The stop is arranged spaced apart from the pivot axis and limits in the slotted hole the pivot angle of the shift lever pivoting around the pivot axis. The casing alternatively has a further slotted hole extending in a curved shape in the pivot direction of the shift lever pivotable around the tilt axis. A stop projecting from the housing engages in the slotted hole. Alternatively thereto, the housing is provided with such a slotted hole, in which a stop projecting from the casing engages. The stop is arranged spaced apart from the tilt axis and limits in the slotted hole the pivot angle of the shift lever pivotable around the tilt axis or the casing pivoting with the shift lever around the tilt axis.

With a further embodiment of the invention, a latch device integrated into the support arrangement is provided. The latch device latches the shift lever in the inoperative or neutral position and also selectively in one of the shifted positions. A latch contour with at least a first latch recess and a second latch recess on the shift lever is provided in the support arrangement. A latch element is prestressed against the latch contour. The latch element is supported on the casing. Upon pivoting movements of the shift lever around the tilt axis, the latch element engages in the first of the latch recesses. The latch element remains in this position until the selection process is concluded. Upon pivoting movements of the shift lever, the latch contour is latched in the second latch recess. In this position, the one gear is engaged. The latch device arrests the shift lever in a shifted position allocated to the gear.

The latch contour is arranged immovably on the shift lever and the latch element is guided on the casing. Alternatively thereto, the latch element is guided on the shift lever and is supported on this. In this case, the latch contour is formed on the casing. It is furthermore provided that the latch element is a roller on a pivot lever. The pivot lever is pivotably fastened at a pivot point fixed to the casing. A spring supported on the casing and engaging the pivot lever remote from the pivot point prestresses the roller against the latch contour. The pivot axis of the pivot lever at the pivot point and the rotation axis of the roller run parallel to the pivot axis of the shift lever. With movements of the latch contour against the roller, the roller rolls out on the latch contour from one latch recess into the other latch recess.

An embodiment of the latch device provides that the pivot lever is pivotably fastened to a projection protruding from the casing. The projection is fastened or formed on the casing, pointing away from the roller. The pivot lever is made of metal sheet and is mounted, pivotably about the pivot point, on the projection by means of a bolt. The pivot lever has a hook-shaped end at one end which does not support the roller. The hook-shaped end at least partially engages behind the projection on a side remote from the pivot lever. With the hook-shaped end, the pivot lever is axially secured, i.e., in the direction of the of the pivot axis of the shift lever, on the bolt. Furthermore, an embodiment of the latch device provides that the pivot lever is formed of sheet metal and that the roller is mounted, movable around the rotation axis, on the pivot lever by means of a bolt. The pivot lever engages at least partially behind the roller at a side remote from the pivot lever. The roller is then secured to the bolt axially, i.e., in the direction of the pivot axis of the shift lever. The roller is prestressed against the latch contour by a tension spring which pulls the pivot lever in the direction of the pivot axis. Alternatively thereto, it is provided that the pivot lever is loaded with a compression spring supported on the casing. The tension spring is guided to the casing in a bushing and is inset with one of its spring ends into the casing. The other end engages on the pivot lever. The latch contour is preferably formed on a metal sheet standing out from the shift lever. The latch contour is formed with a latch depression in the sheet metal. The sheet metal is fastened to the shift lever in a suitable fashion, e.g. by welding or by a bushing drawn over the shift lever. The metal sheet engages through an aperture in a wall of the casing. The latch contour is then formed at one end of the metal sheet and is situated outside the wall of the casing. The roller is arranged outside of the casing and is provided with latch depressions, aligned one after another transversely of the pivot axis of the shift lever and adjoining one another.

It is furthermore provided that the support arrangement has a device for increasing selection forces. The device is formed at least from a ramp fixed to the casing and at least one runoff roller. The runoff roller is prestressed against the ramp by means of a spring. The ramp is preferably formed of a metal sheet, stamped and if necessary with cutting or non-cutting finishing. The metal sheet is welded to the casing. Alternatively thereto, the ramp is provided, directly formed on a casing formed from sheet metal. Upon pivoting movements of the shift lever around the tilt axis, the ramp pivots with the casing against the runoff roller supported on the housing. The runoff roller then rolls on the ramp. The forces on selection of a shift plane of the forward gears and also on selecting reverse gear are controllable by means of the force of the spring and the contour of the ramp. The ramp rises over at least one imaginary abscissa extending transversely from an imaginary plane. The plane extends here with the tilt axis and is aligned so that the pivot axis passes through it at right angles. The ramp rises over the abscissa away from the plane. The runoff roller is supported to rotate around a rotation axis which is stationary with respect to the housing. The shift lever pivoted around the tilt axis takes with it the casing with the ramp. The ramp is moved against the runoff roller. The runoff roller then rises on the ramp against the force of the spring. The selection force is increased.

Alternative embodiments are provided for the alignment of the ordinate which is at right angles to the abscissa and describes the rise. One embodiment provides that the ordinate runs with the plane parallel to the tilt axis. The ramp points away from the casing. Its contour which comes into contact with the runoff roller moves away from the casing with increasing rise. The runoff roller is thereby prestressed against the ramp in the direction of the casing.

The runoff roller is preferably rotatably fastened to a lever. The lever is arranged pivotably around a pivot fixed to the housing. One or more springs engage on the lever at a distance from the pivot of the lever. The lever is prestressed against the ramp via the runoff roller by means of the spring. The rotation axis running through the pivot of the lever and around which the lever pivots, and the rotation axis of the roller, are aligned perpendicularly of the tilt axis of the shift lever, and preferably run parallel to the wall of the casing. A uniform force distribution is attained with two ramps on the casing. One of the previously described levers with a respective one of the runoff rollers acts on each of the ramps. The levers are arranged mutually opposite on each side of the casing. The levers take the casing with the ramps between them and are prestressed against one another by means of at least one tension spring. The tension spring is respectively inset at a free end, remote from the pivot, of one of the levers. A uniform force distribution and an equalization of movement between the levers is ensured. The support of the casing in the housing, in contrast to that having a device on one side for increasing the selection force, is free from undesired transverse forces due to one-sided loading.

Alternatively to the alignment of the ordinate, an embodiment of the device provides that the ordinate describing the course of the contour is aligned perpendicular to the tilt axis and at the same time runs with the plane. The ordinate preferably runs parallel to one of the walls of the casing and intersects the tilt axis. The ramp is therefore loaded by means of the runoff roller either in the direction of the tilt axis of the shift lever or out of the direction of the tilt axis of the shift lever. The runoff roller is furthermore rotatably fastened to a lever. The lever is pivotable around a pivot fixed to the housing. At least one, or else more, springs which engage the lever remote from the pivot prestress the lever by means of the runoff roller against the ramp pointing away from the tilt axis or pointing toward the pivot axis. The rotation axis, running through the pivot, of the lever and the rotation axis of the roller are aligned parallel to the tilt axis of the shift lever. For this alternative embodiment, it is furthermore provided that two ramps are arranged on the casing. The ramps are fastened or formed on two wall sections of the casing which face away from one another and point outward. A respective one of the levers, with a respective one of the runoff rollers, acts on each of the ramps. Each of the levers is prestressed against the ramp via one of the runoff rollers by means of a spring supported on the housing.

For a support arrangement of a shift lever on a multi-gear gearbox, it is provided by a further embodiment of the invention that the ramp rises on both sides away from the plane, starting from a coordinate origin, situated in the plane, of the coordinate system formed by the abscissas and the ordinates, over a first abscissa and also over a second abscissa directed oppositely to the first abscissa. The shift lever when in the neutral position stands vertically in the casing. The mid-axis of the shift lever then runs with the plane outgoing from the tilt axis. The ramp rises on both sides of the plane starting from the coordinate origin and also away from the plane. The runoff roller abutting on the ramp at the height of the coordinate origin in the neutral position is centered with respect to the coordinate origin by means of the rising flanks. The spring force acting on the lever forces the runoff roller into this depression on the ramp and thus keeps the casing arrested in the neutral position of the shift lever by means of the force of the spring. The course of the ramp can be shaped as a mirror image from one side of the plane to the other side of the plane, or can have a different rise from one side of the plane to the other side of the plane. Selection forces can additionally be fine adjusted by means of the number, spring characteristics, and lever ratios on the levers.

The rise of the ramp has a considerable effect on the selection force on the shift lever pivoting around the tilt axis. For the selection of the shift planes of the forward gears in a multi-gear gearbox, a flat rise of the ramps on both sides of the plane is provided. The runoff roller runs off on this portion of the ramp when the shift lever is selectively pivoted (around) the tilt axis in one or other pivoting direction for selecting one of the shift planes of the forward gears. The counterforce on the shift lever increases only slightly with increasing pivot angle of the shift lever. To select the shift plane of the reverse gear, the shift lever is pivoted in a pivoting direction beyond its position in a shift plane with forward gears and out into the shift plane of the reverse gear. The casing, with the shift lever and thus also the ramp, then pivots further. The shallow rising ramp adjoins a section on the ramp which rises in a marked bend away from the abscissa. When the shift lever reaches its position in front of the shift plane of the reverse gear, the roller runs onto the section of the ramp with the steep rise. The lever is moved against the force of the spring by means of the runoff roller rising on the steeply rising ramp. The counterforce on the casing, and thus on the shift lever, rises abruptly. The operator is signaled by means of this rise of force on the shift knob that he is about to select the reverse gear.

With a further embodiment of the invention, a locking device is provided on the support arrangement of the shift lever. At least two, however for the most part three or four, selector shafts are situated side by side in the pivot region of the shift finger. In the inoperative position situated in the selection plane and also the neutral position of the shift lever, the selector shafts are in a middle, neutral position. The gears, which can be shifted by means of the selector shafts, by longitudinal displacement of the selector shafts, are not shifted. Each of the selector shafts has an engagement groove or shift opening for the engagement of the shift finger. By selection movements of the shift lever in one of the shift planes, the shift finger engages in one of the selector shafts. An articulated connection is made between the selector shaft and the shift lever.

In the shift movement, in which the shift lever pivots around the pivot axis following the selection movement, the selector shaft connected to the shift lever is displaced longitudinally and one of the gears is engaged. During the shift movement of the shift lever, the other selector shafts which are not in engagement with the shift lever are locked against longitudinal movements. The selector shafts are locked by means of the support arrangement after the conclusion of the selection process. For this purpose, at least one locking finger is formed on the casing. This locking finger engages in a slot formed on the selector shaft and fixes the selector shaft longitudinally. The slot is open in the direction of the locking finger and also in the direction of the shift lever pivoting around the tilt axis. In the middle, neutral position of the selector shafts, the selector shafts or the slots of the selector shafts are aligned with respect to one another such that the slots are situated one behind another in the pivoting direction of the locking finger and are mutually aligned.

The locking finger pivots on selection movements on the shift lever with the casing pivoting around the tilt axis and can move freely in its pivoting direction through the mutually adjacent slots, until the shift finger engages in one of the selected longitudinally movable selector shafts and the shift finger positively engages in the slot or slots of a selector shaft to be fixed. The selector shaft acted on by the shift finger is thus not locked by the locking finger and is freely movable in the longitudinal direction by means of the shift finger. With pivoting movements of the shift lever in the slots of the locked selector shafts, the locking finger remains in the slots of the locked selector shafts and holds these during the shift processes and during travel, with the engaged gear in its locked position.

An embodiment of the invention provides that at least three of the selector shafts are allocated to the shift finger. The locking finger engages in two of the selector shafts simultaneously. The shift finger is positively connected to the selector shaft to be shifted. If the shift finger, after the conclusion of the selection process, is in a shift plane which is allocated to a selector shaft arranged between two selector shafts which are to be locked, the locking finger simultaneously locks the adjacent selector shafts. A clearance on the locking finger ensures that the selected selector shaft is free to move longitudinally by the shift finger and not contacted by the locking finger. The clearance is placed over the slot of the longitudinally freely movable selector shaft. The locking finger thus does not engage in the slot on this selector shaft. The selector shaft movable with the shift finger passes through the clearance on the locking finger and is thus out of contact with the locking finger. The locking finger is in its simplest form a flat sheet metal portion. The sheet metal portion either projects integrally from the wall of the casing in an imaginary plane through which the tilt axis of the shift lever passes perpendicularly, or is separately fastened to the said wall. The locking finger is in this plane so wide that in each pivoted position of the locking finger each of the selector shafts to be locked can be acted on by means of the locking finger.

The support arrangement for a shift lever according to the invention has elements, with the device to increase the selection force, the latching device, and the locking device, elements which are usually arranged in the gearbox separately from a support arrangement of the shift lever. A space-saving and also easily produced shift device is provided by the invention. The support arrangement of the shift lever can be preassembled as a module, the casing of the shift lever being predominantly the basis for the fastening of further elements of the shift transmission.

BRIEF DESCRIPTION OF THE DRAWINGS

The invention is explained in detail hereinafter on the basis of embodiment examples.

FIGS. 1–9 show an exemplary embodiment of a support arrangement according to the invention in different views and sectional diagrams. Individually, FIG. 1 shows an overall view of the support arrangement, FIG. 2 shows a longitudinal section through the support arrangement, FIG. 3 shows a cross section of the support arrangement, FIG. 4 shows a schematic diagram of the position of the tilt axis and the pivot axis in relation to the shift lever, FIG. 5 shows a longitudinal section through the support arrangement with the shift lever pivoted in a selection direction around the tilt axis, FIG. 6 shows a cross section through the device with the shift lever pivoted around the pivot axis in a shift position, FIG. 7 shows an overall view of the support arrangement without the housing, FIG. 9 shows a side view of the support arrangement with the locking finger.

DETAILED DESCRIPTION OF THE PREFERRED EMBODIMENTS

Figure 1:
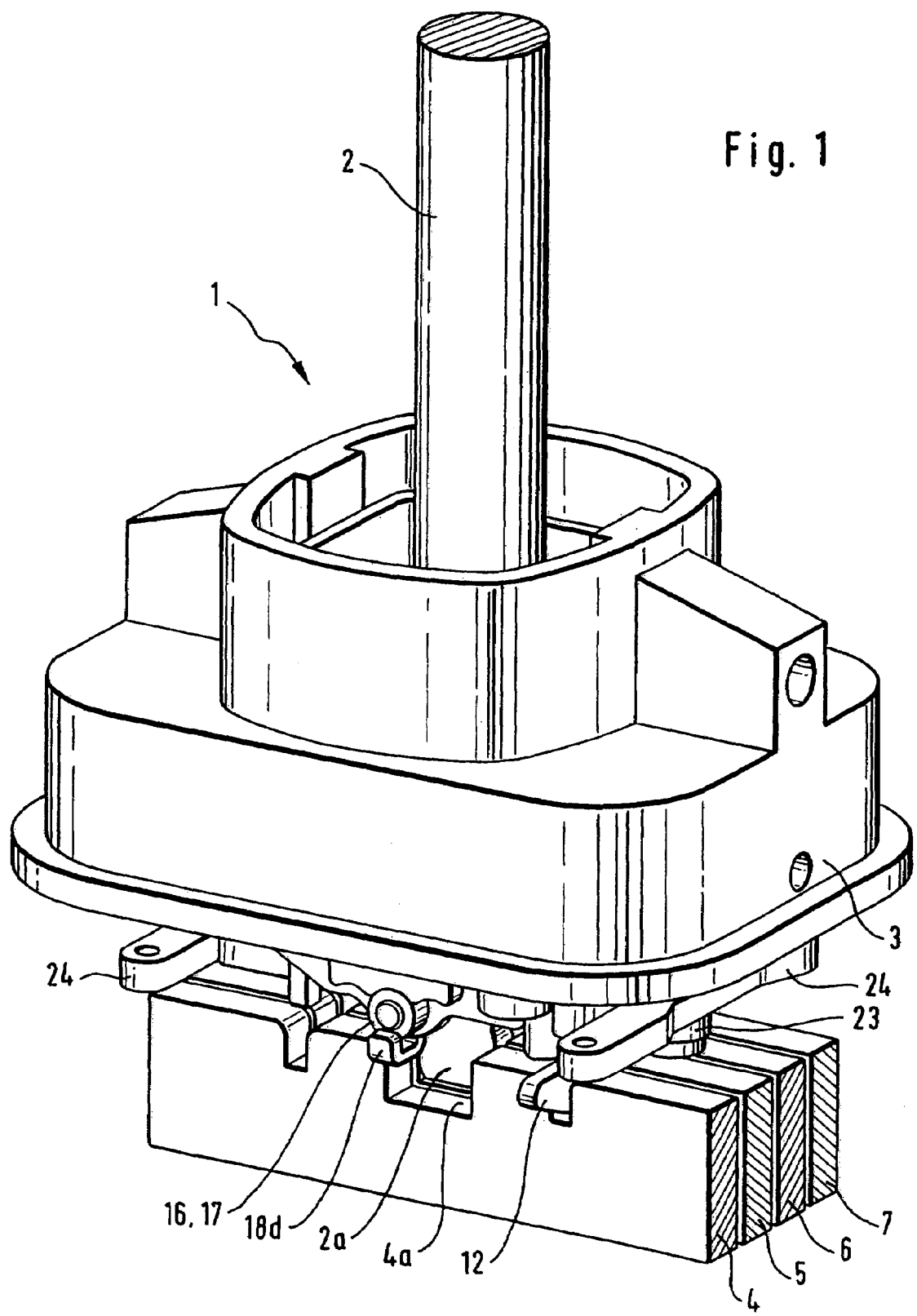

FIG. 1 shows an overall view of an exemplary embodiment of a support arrangement 1. A shift lever 2 is supported in the support arrangement 1. The support arrangement 1 is received in a housing 3. The shift lever 2 acts selectively with a shift finger 2a on selector shafts 4, 5, 6 and 7. The selector shafts 4, 5, 6 and 7 are respectively provided with an engagement groove 4a, 5a, 6a, 7a, in which the shift lever 2 engages in dependence on its selection position.

Figure 2A:
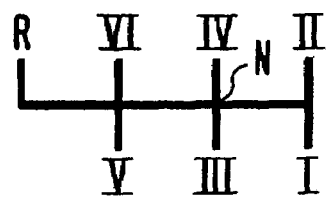
FIG. 2a shows a shift schematic of the positions of the shift lever.
Figure 2:
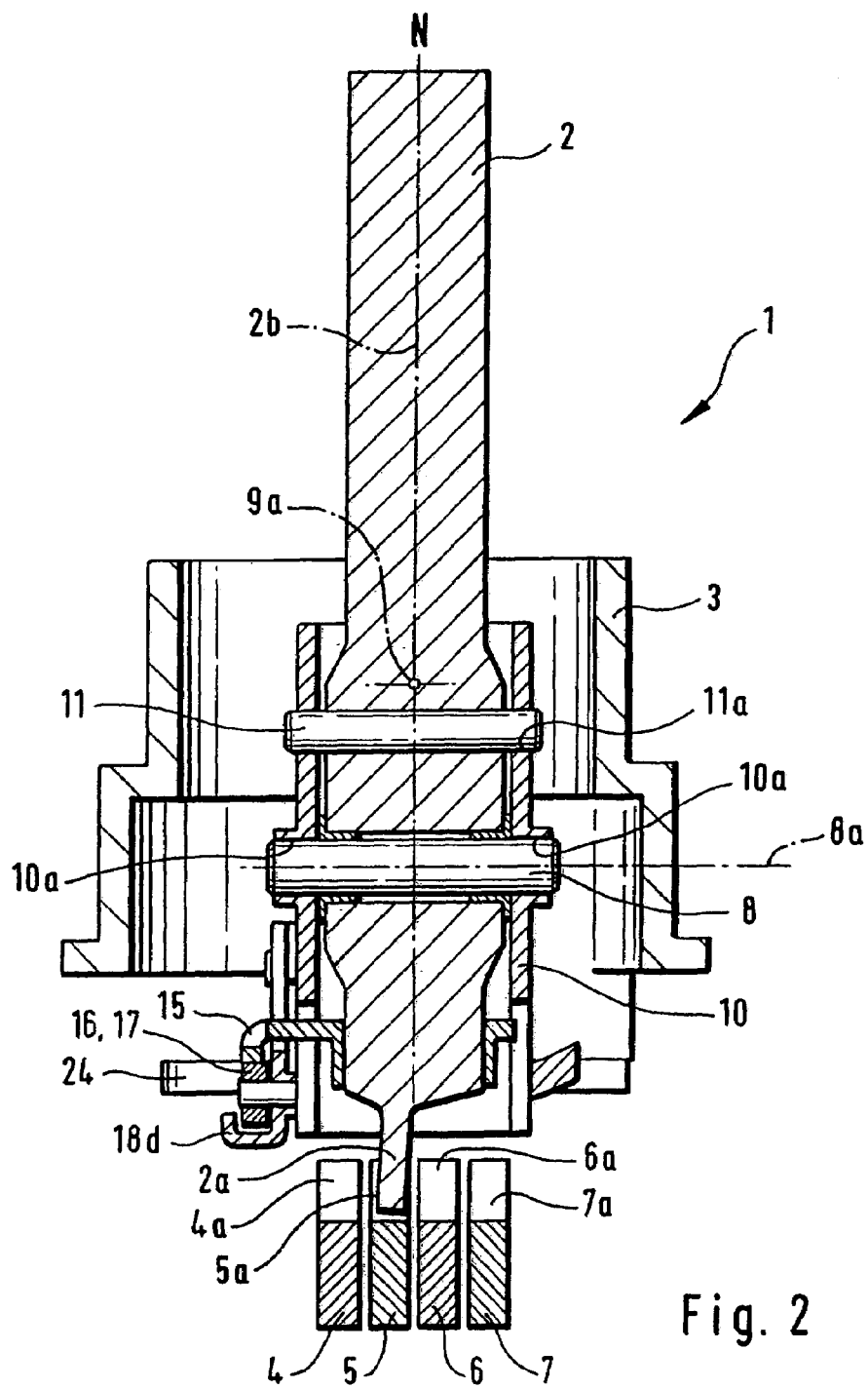

The support arrangement 1 is shown in section in FIG. 2. The shift lever 2 is in the neutral position N. The shift finger 2a runs at a slight angle to the mid-axis 2b, which is in the neutral position of the shift lever (not "finger") 2, and engages in the engagement groove 5a of the selector shaft 5. The selector shafts 4, 5, 6 and 7 are in a neutral middle position. In this neutral middle position, the engagement grooves 4a, 5a, 6a and 7a are aligned one behind the other in the pivoting direction of the shift lever 2 and also aligned with one another. The shift lever 2 is arranged in the support arrangement 1 to be pivotable out of the neutral position N around the tilt axis 9a running perpendicularly of the drawing. The shift finger 2a is pivotable around the tilt axis 9a with free movement within the engagement grooves 4a, 5a, 6a, and 7a when the shift lever 2 is pivoted. The shift lever 2 is mounted in a casing 10 for pivoting around the pivot axis 8a on a pivot stud 8. The pivot stud 8 is seated fixed in support eyelets 10a of the casing 10. Furthermore, a stop 11 in the form of a pin is fastened in the shift lever 2. The pivoting angle of the shift lever 2 around the pivot axis 8a in a slotted hole 11a extending in the pivoting direction is limited by the stop 11 (see also FIG. 7).

The shift lever 2 with the shift finger 2a is pivotable around the pivot axis 8a from the neutral position N. The shift finger 2a then acts on a side of the engagement groove 5a situated in the pivoting direction. A shift plane from which the third and fourth gears can be shifted is allocated to the selector shaft 5. FIG. 2a shows the shift diagram for the selection or shift positions of the shift knob 2c. The shift lever 2 is pivotable around the tilt axis 9a out of the shift plane III-IV toward the shift plane I-II. In the shift plane I-II, the shift finger 2a engages in the selector shaft 4. The first or second gear can be shifted with the selector shaft 4 by means of the shift lever 2 pivoting around the shift axis 8a. The shift finger 2a pivoted around the tilt axis 9a in the shift plane VI-V engages in the selector shaft 6. The fourth or fifth gear can be selectively engages by pivoting the shift lever 2 around the pivot axis 8a. The shift plane of the reverse gear R is selected by a pivoting movement of the shift lever 2 around the tilt axis 9a beyond the shift plane VI-V. The shift finger 2a then engages in the engagement groove 7a of the selector shaft 7. The reverse gear can be shifted into from this position by pivoting the shift lever 2 around the pivot axis 8a.

Figure 5:
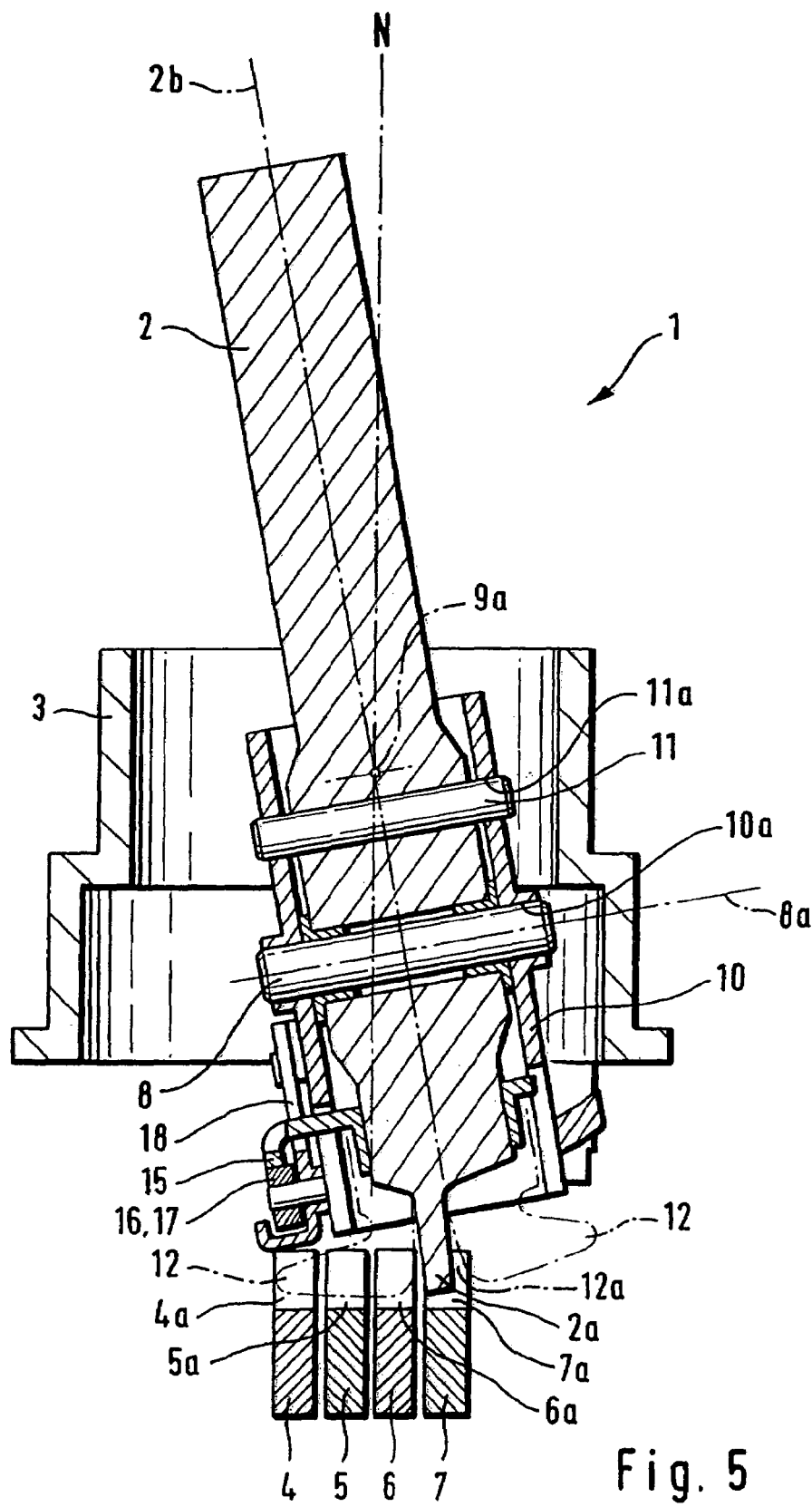

FIG. 5 shows the same section as in FIG. 2. The shift lever 2 is however moved into the shift plane of the reverse gear R by pivoting around the tilt axis 9a. The shift finger 2a engages for this purpose in the engagement groove 7a of the selector shaft 7. From this position, the shift lever 2 is pivotable around the pivot axis 8a. The shift finger 2a pivoting with the shift lever 2 then drives the selector shaft 7 in its longitudinal direction until the reverse gear R is engaged.

Figure 3:
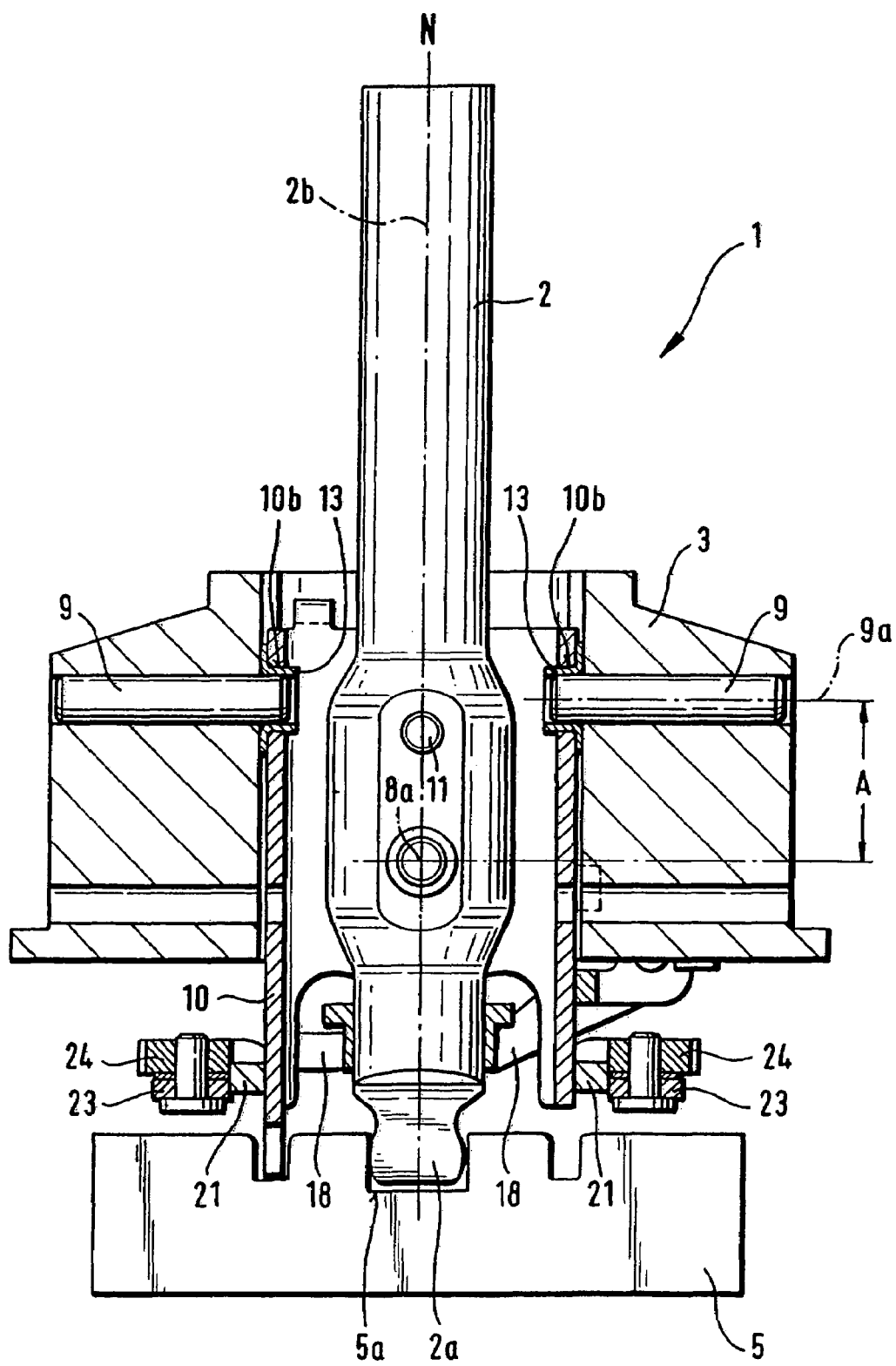

FIG. 3 shows a cross section of the mounting arrangement 1. The shift lever 2 is located in the neutral position and engages with its shift finger 2a in the selector shaft 5. In this view, the selector shaft 4 is hidden by the selector shaft 5. The shift finger is positively coupled to the selector shaft 5 by the engagement in the engagement groove 5a. The shift lever 2 is pivotable out of the neutral position around the tilt axis 9a and the pivot axis 8a. The tilt axis 9a is the midline of two pivot studs 9. The pivot studs 9 are arranged fixed in the housing 3 and respectively engage in a support eyelet 10b in the casing 10. The casing 10 is supported on the pivot studs 9 by the shift lever 2 by means of plain bearings 13 in the support eyelet 10b. The pivot axis 8a and the tilt axis 9a run spaced apart from each other by the distance A and also transversely of one another. The pivot axis 8a is situated nearest to the shift finger 2a.

Figure 4:
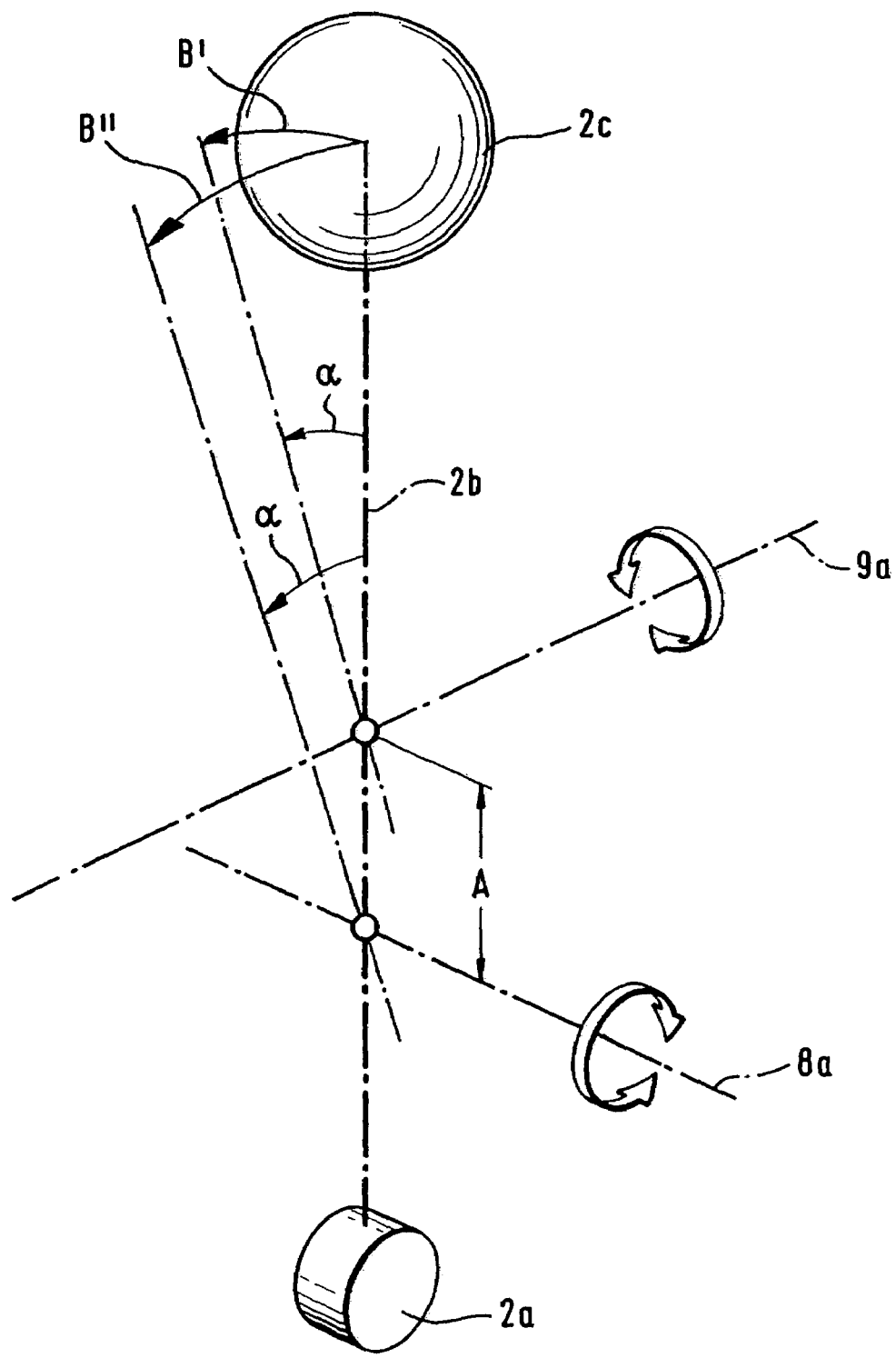

FIG. 4, which is a schematic diagram of the shift lever 2 with the axes 8a, 9a, shows that different selection and shift paths at the shift knob 2c of the shift lever can be attained by means of the axes 8a, 9a mutually spaced apart by the distance A. The shift knob 2c travels the path B' in radian measure when the shift lever 2 is pivoted by the angle a around the tilt axis 9a. When the shift lever 2 is pivoted by the same angle α around the pivot axis 8a, the shift knob 2c travels the path B" in radian measure. Because of the distance A between the axis 8a and the axis 9a, B" is greater than B'.

Figure 6:
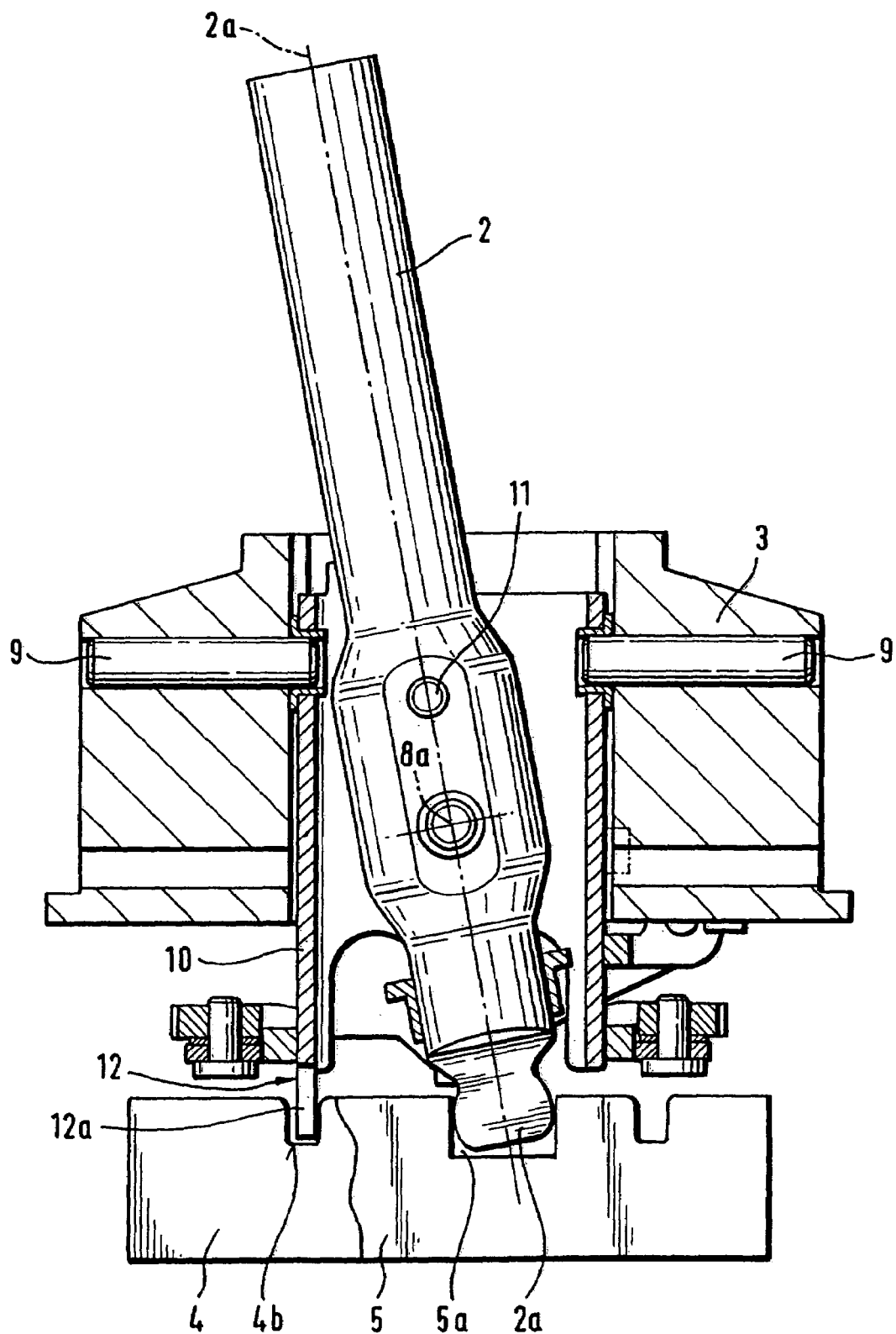
Figure 9:
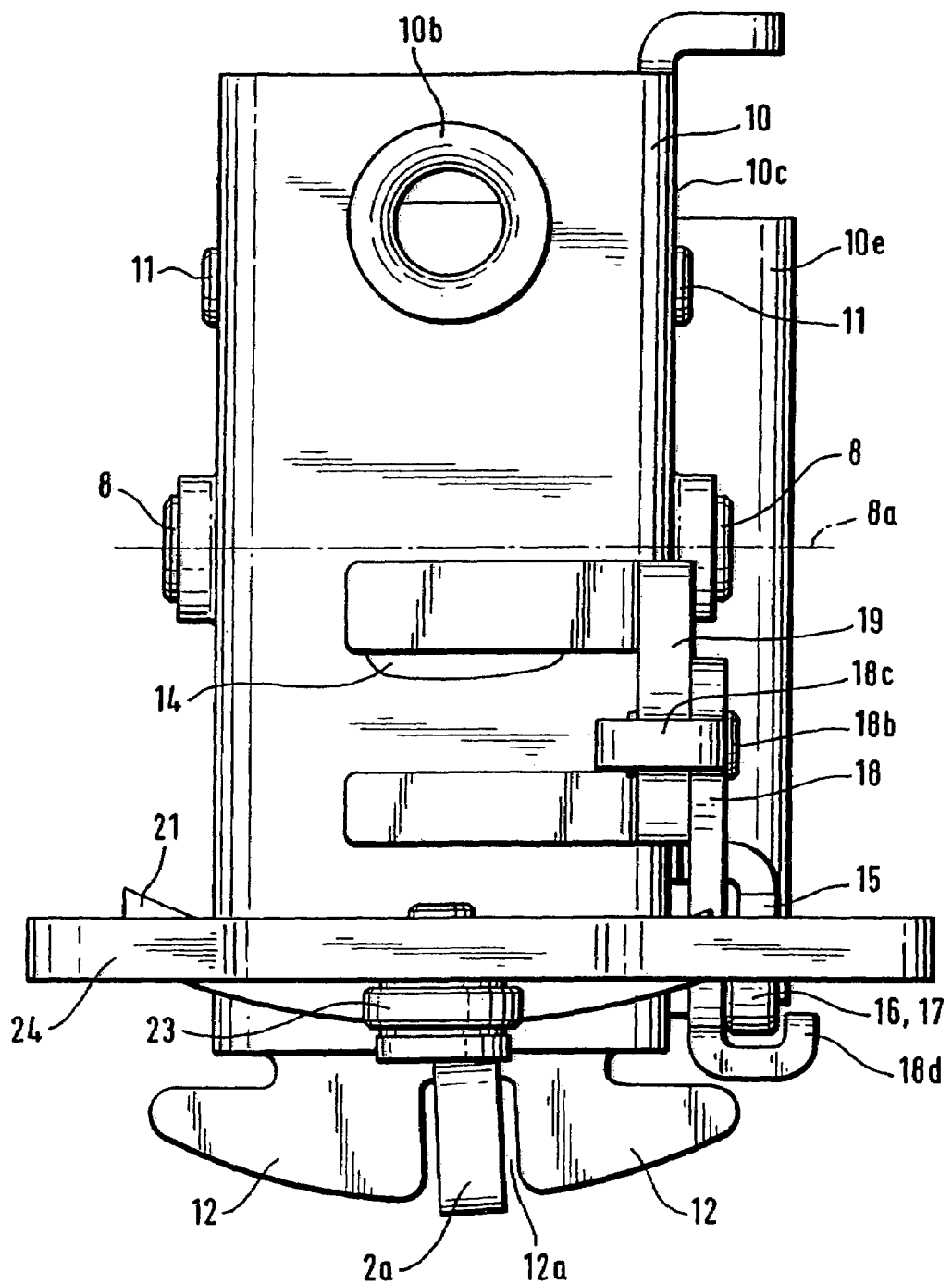

FIG. 6 shows the support arrangement 1 in the same sectional illustration as in FIG. 3. The shift lever 2a is pivoted around the pivot axis 8a into a shift position and thus has displaced the selector shaft 5 in its longitudinal direction by means of the shift finger 2a. The selector shaft 4 remains unchanged in its position. In this position, the selector shaft 4 is fixed to the casing 10 by means of a locking finger 12. The locking finger 12 engages in a slot 4b on the selector shaft 4 for this purpose. In FIG. 5, the locking finger 12 is at least partially shown in a front view. The locking finger is divided by means of a clearance space 12a. By means of the clearance space 12a, the selector shaft 5 is displaceable in the arrangement illustrated according to FIG. 6 without contact with the locking finger 12. As can be seen from the view in FIG. 5, the locking finger pivots with the shift finger around the tilt axis 9a when one of the shift planes is selected with the shift lever 2. In FIG. 5, the locking finger 12, by means of the clearance space 12a, releases the selector shaft 7 for shifting to the reverse gear, and in FIG. 6 the selector shaft 5 for shifting one of the gears allocated to the selector shaft 5. FIG. 9 shows the casing 10 with the locking finger 12, without the selector shafts. The shift finger 2a is pivotable around the pivot axis 8a in the direction of the clearance 12a, so that each of the selector shafts in engagement with the shift finger 2a is displaceable without contact with the locking finger 12, due to the clearance 12a.

Figure 7:
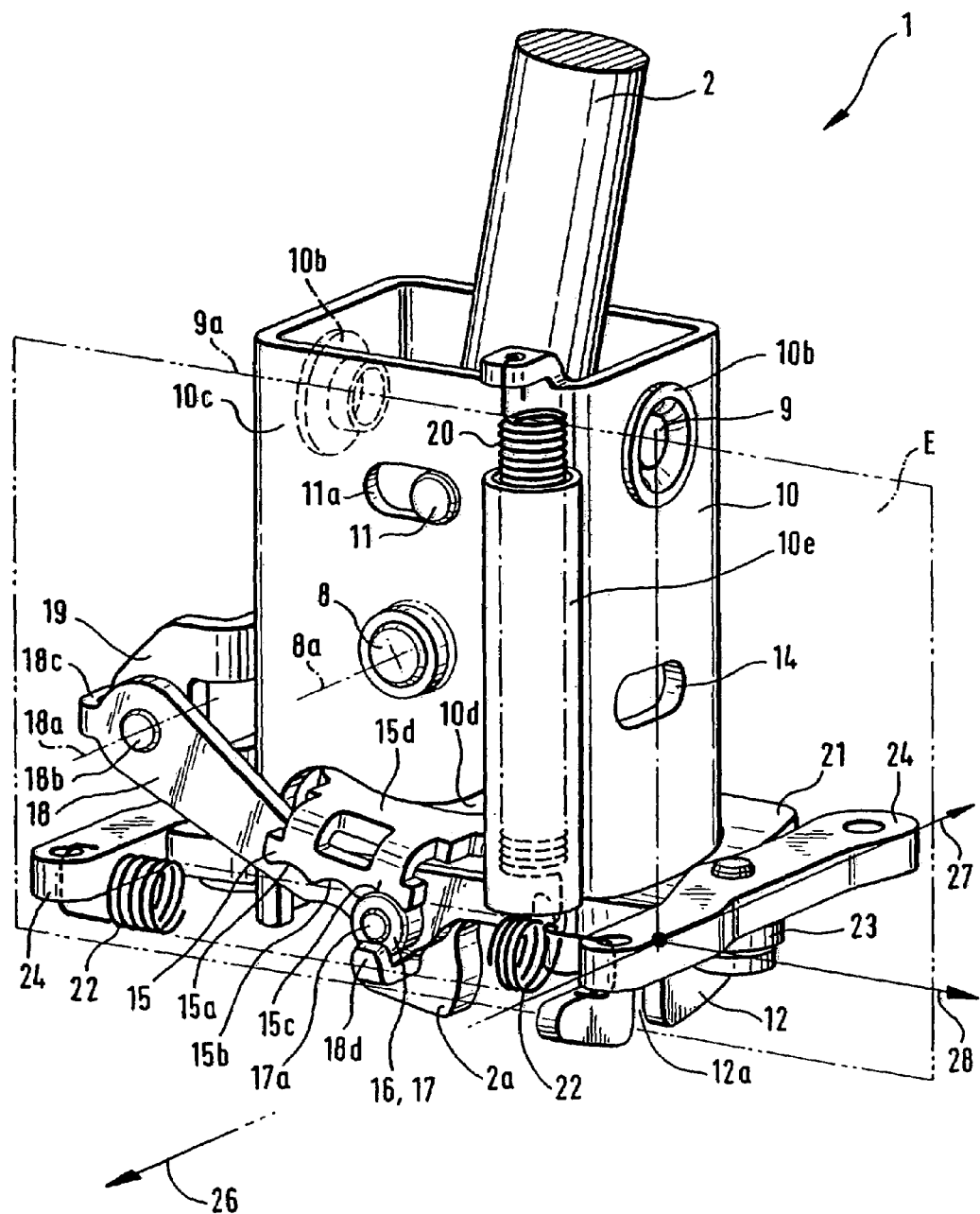

FIG. 7 shows the support arrangement 1 without the housing 3. The casing 10 is manufactured from a profile or is bent into a profile from sheet metal. Slotted holes 11a and 14 are formed in the casing. The stop 11 engages in the slotted hole 11a, as already initially described. The stop 11 extends from the shift lever 2. The pivot angle of the shift lever 2 around the pivot stud 8 in the casing 10 is limited by the stop 11 in the slotted hole 11a. The stop 11 abuts on a respective end of the slotted hole 11a when a gear is shifted. A stop (not shown) extending from the housing 3 engages in the slotted hole 14. The pivoting movement of the casing 10 around the pivot stud 9 is limited by means of the stop in the slotted hole 14.

The support arrangement 1 has a latch contour 15 with latch depressions 15a, 15b and 15c. The latch contour 15 is formed from sheet metal. The metal sheet is bent angularly and fastened to the shift lever 2 by means of a prolongation 15d extending from the latch contour 15. The prolongation 15d here passes through a wall 10c of the casing 10 through which the pivot axis 8a of the shift lever 2 passes, at an opening 10d of the wall. A latch element 16 is prestressed against the latch contour 15. The latch element 16 is a roller 17. The roller 17 is rotatably seated on a bolt 17a. The bolt 17a is fastened to a pivot lever 18. The pivot lever 18 is fastened to a bolt 18b for pivoting around the pivot point 18a. The bolt 18b is fastened to a projection 19 aligned with the tilt axis 9a and pointing away from the rotation axis of the roller 17. The pivot lever 18 is formed from sheet metal and has a hook-shaped end 18c. The hook-shaped end 18c engages behind a projection 19 on a side remote from the pivot lever 18. The pivot lever 18 is thereby secured to the bolt 18b axially at the projection 19. The roller 17 which, rotatable around its rotation axis, is mounted on the pivot lever 18 and is secured by means of a further hook-shaped end 18d to the pivot lever 18. The hook-shaped end 18d then engages behind the roller 17 at a side remote from the pivot lever 18.

The pivot lever 18 is loaded at an end remote from the pivot point 18a by a spring 20. The spring 20 is a tension spring and has one end inset into the pivot lever 18 and the other end inset into the casing 10. The spring 20 pulls the pivot lever 18 with the roller 17 against the latch contour 15 and is guided in a bushing 10e on the casing 10. The shift lever 2 is located in a shifted position in FIG. 7, pivoted around the pivot axis 8a. The stop 11 abuts one end of the slotted hole 11a. In this position, the roller 17 is latched in the latch depression 15c and arrests the shift lever 2 in its position. If the shift lever 2 is pivoted around the pivot axis 8a in the opposite sense to its existing pivoting position, the roller 17 rises out of the latch depression 15c and next latches in the latch depression 15b. In this position, the shift lever 2 is either in the neutral position or in one of the inoperative positions of the shift planes before the shifting of a gear. If the shift lever 2 is further pivoted in this direction, the roller 17 finally latches in the latch depression 15a and arrests the shift lever 2 in a further shift position.

The support arrangement 1 has a device for increasing selection forces. As can be gathered from FIGS. 8a and 8b, the device is formed from two ramps 21, a runoff roller 23 respectively prestressed against the ramp by a spring 22, and also two levers 24. The ramps 21 are formed on a stirrup-shaped metal sheet 25. The metal sheet 25 is fastened to the casing 10. The levers 24 are respectively arranged pivotably in the direction of the casing 10 around a fixed pivot 24a fixed to a housing (not shown). Each of the runoff rollers 23 is rotatably arranged on a lever 24. The tension spring 22 is respectively hooked with one of its ends into an end of the lever 24 opposed to the pivot 24a. The levers 24 are prestressed against one another by means of the tension spring and thus against the casing 10. Thus a respective one of the rollers 23 is pulled by the lever 24 against a respective one of the ramps 21.

Figure 8A:
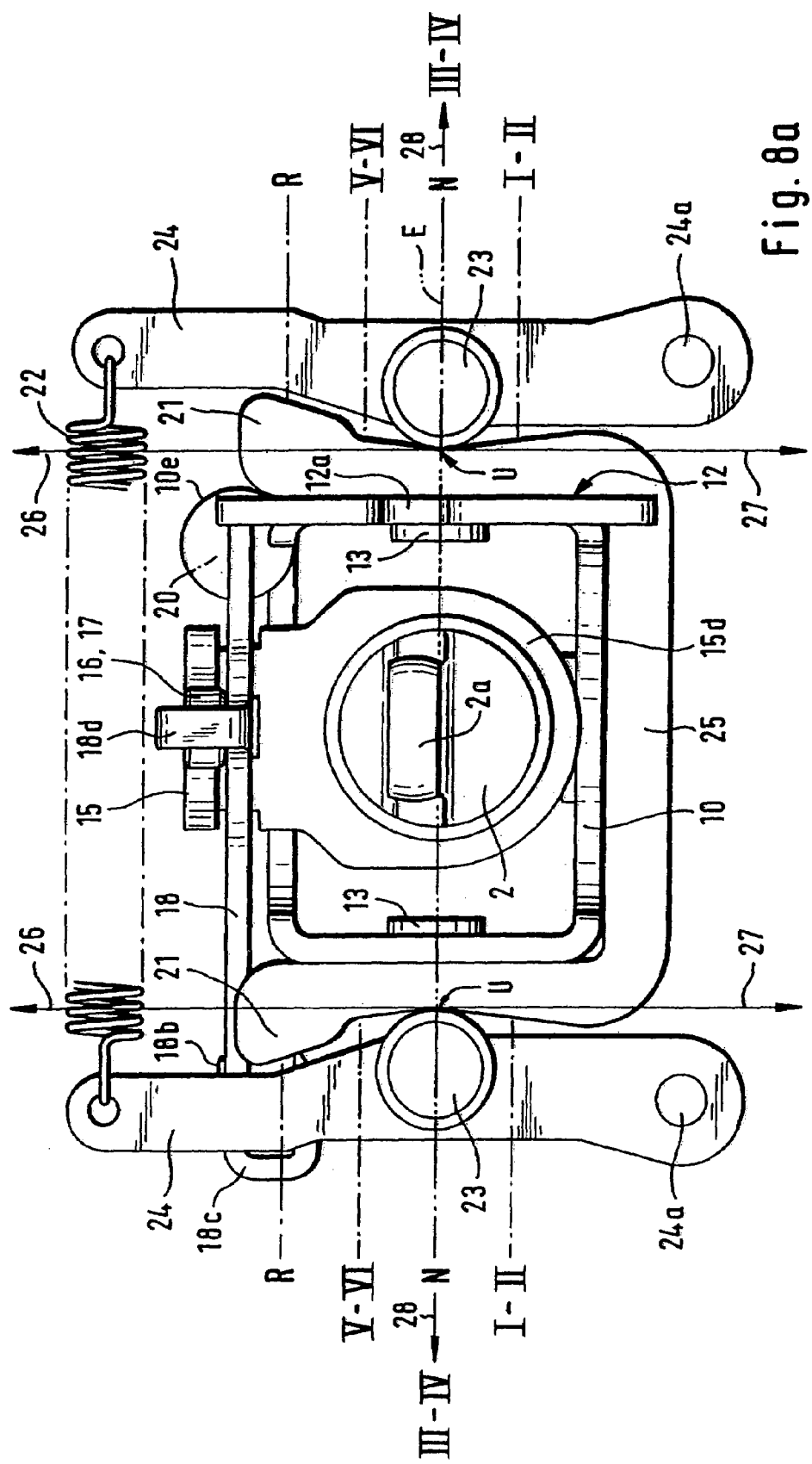
FIG. 8a shows a view of the support arrangement from below, in the neutral position of the shift lever.
Figure 8B:
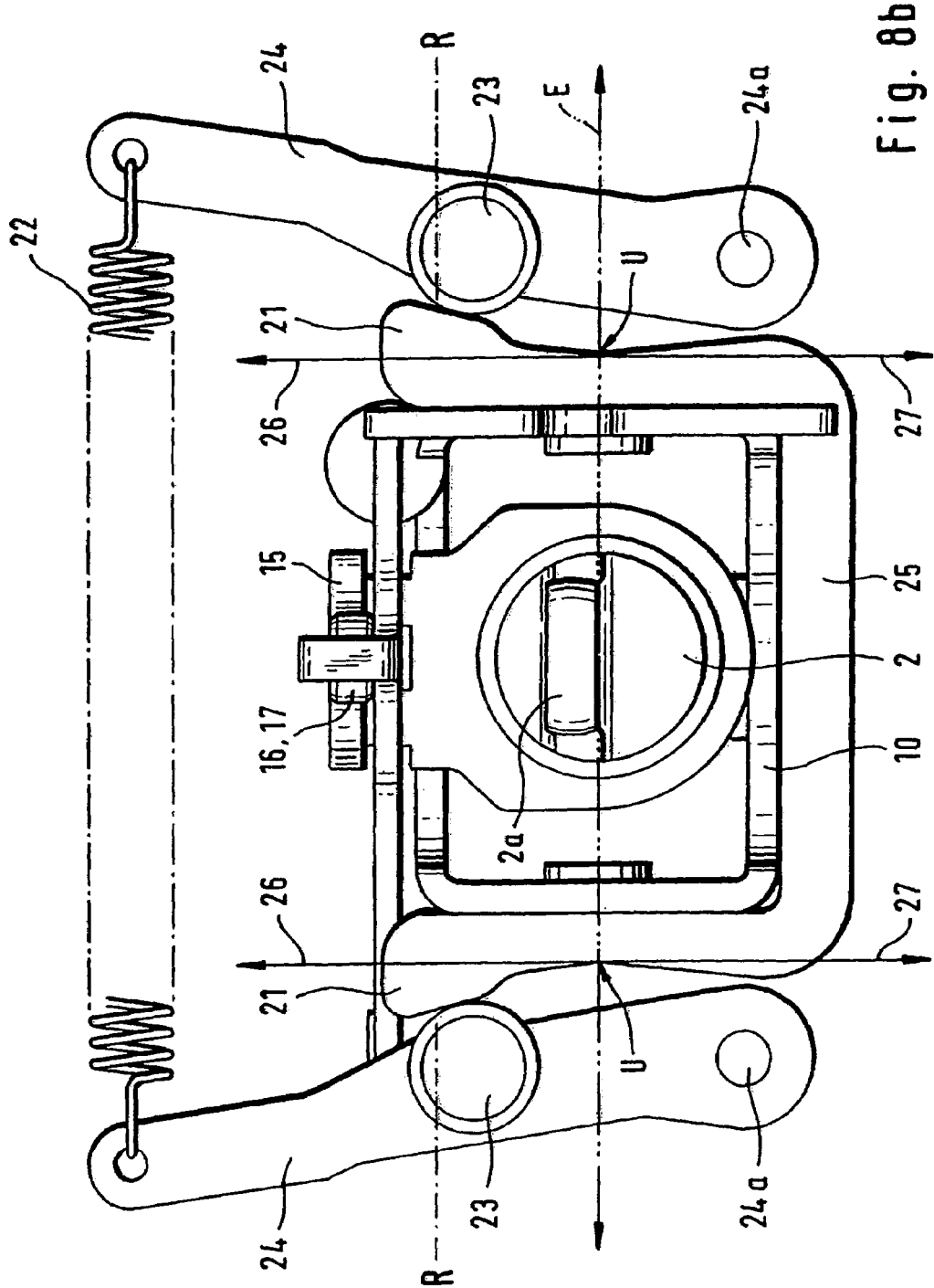
FIG. 8b shows a view of the support arrangement from below, with the shift lever pivoted into the shift plane of the reverse gear.

The ramps 21 are divided into sections of different slope, and each has the same ramp contour. The contour of each ramp 21 rises over two abscissas 26, 27 pointing in opposite directions starting from a coordinate origin U. The abscissas 26 and 27 start transversely from an imaginary plane E and are thus aligned parallel to the pivot axis 8a of the shift lever 2 (FIGS. 7, 8a, 8b). The plane E runs with the tilt axis 9a of the shift lever 2 and has the pivot axis of the shift lever 2 passing through it at right angles. The coordinate origin U is situated in the plane E. A shift lever pivoted around the tilt axis 9a pivots the casing 10 with the ramp 21 against the runoff roller 23 which is fixed in the pivoting direction. The contour of the ramps 21 is moved in the pivoting direction to the rotation axis of the runoff roller 23, whereby the respective runoff roller 23, prestressed against the ramp 21, rolls rising on the ramp 21. The ordinate 28 aligned at right angles to the abscissas 26 and 27 runs parallel to the tilt axis 9a with the plane E.

Since the ramp 21 rises away from the plane E on both sides of the coordinate origin U, a respective roller 23 on a ramp 21 in the neutral position N of the shift lever is centered at the coordinate origin U. The ramp 21 runs initially with a shallow rise over both the abscissa 26 and also over the abscissa 27. The runoff rollers 23 rising on the sections with the shallow rise produce at the shift lever 2, pivoted for selecting a shift plane with a forward gear, a relatively small selection force. Upon shifting one of the gears from the shift planes, the runoff rollers 23 respectively remain in one of the positions denoted I-II or V-VI on the respective ramp 21. In these positions, the shift lever 2 is in one of the shift planes I-II or V-VI, from which a gear can then be engaged in the respective shift plane by pivoting the shift finger 2. If the shift lever 2 is pivoted further out with the casing 10 over the position V-VI, the runoff roller 23 rising on the ramp 21 encounters a section of the ramp 21 which rises sharply away from the abscissa 26. A selection force is exerted on the casing 10 and thus on the shift lever 2 because of the steep rise, and is markedly greater than the selection force for selection of the forward gears. The shift lever 2 is about to move into the shift plane for shifting to the reverse gear R. The steep rise on the ramp 21 is finally followed by a shallower rise until in the position R. If the runoff roller 23 is in the position R, the shift plane of the reverse gear is selected. This position is shown in the drawing of FIG. 8*b*. The shift lever 2 can be pivoted out of the position R around the pivot axis 8*a* for shifting to the reverse gear R.

Figure 10:
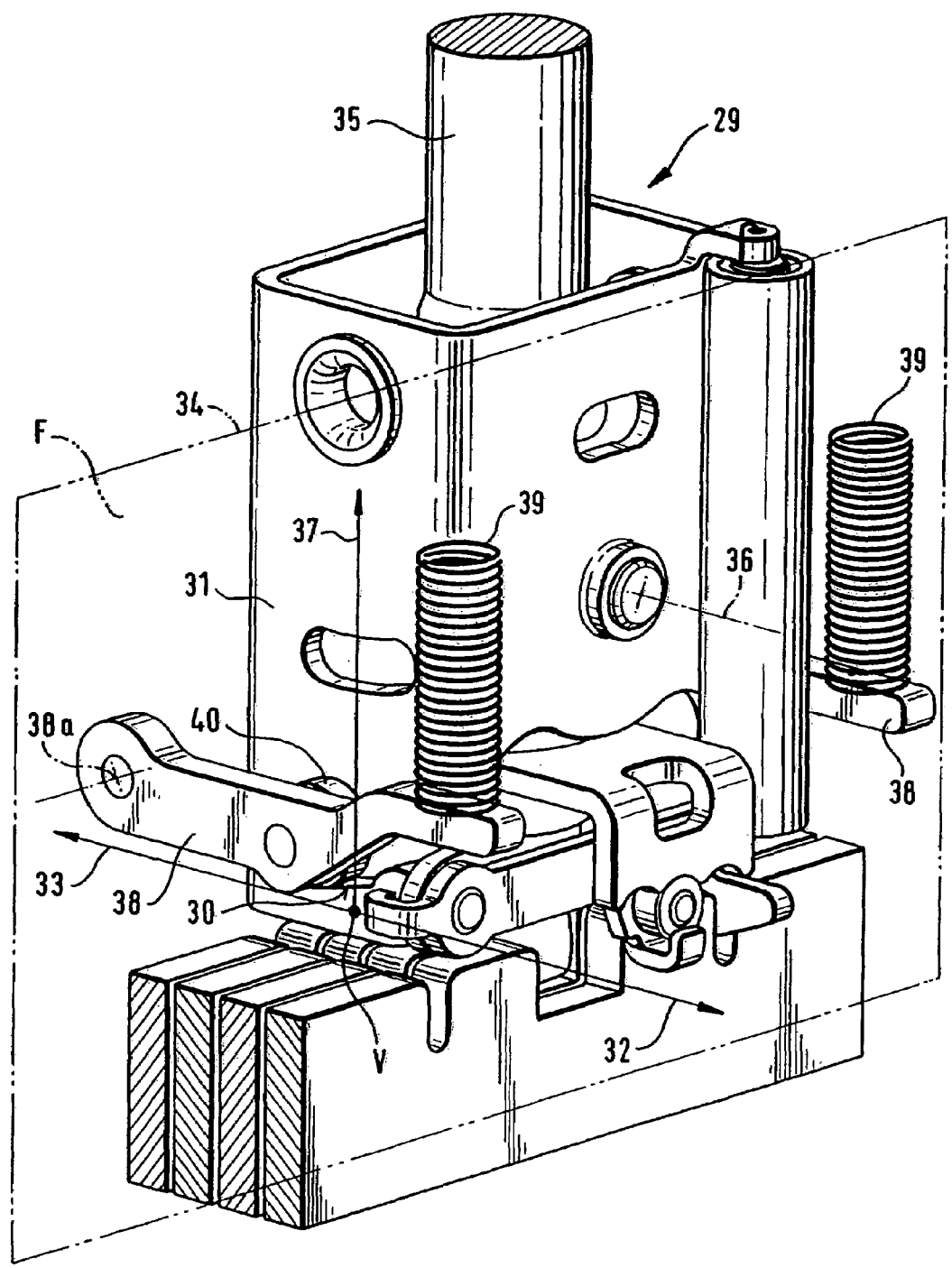
FIG. 10 shows a further embodiment example of a support arrangement according to the invention, without housing.

FIG. 10 shows a further exemplary embodiment of a support arrangement according to the invention. The support arrangement 29 is shown without the housing. Its construction substantially corresponds to the support arrangement 1 of FIGS. 1–9. However, it differs in the construction of the arrangement of the device for increasing the selection force. The support arrangement 29 has two ramps 30, one of which is shown in the drawing, the other being hidden by a casing 31. The ramp 30 rises in the said example over two abscissas 32 and 33 pointing in opposite directions. The abscissas start at right angles from an imaginary plane F running with the tilt axis 34 of the shift lever 35 and having the pivot axis 36 of the shift lever 35 passing through it at right angles. The coordinate origin V of the coordinate system is situated in the plane F. An ordinate 37 running in the plane F starts from the coordinate origin V, at right angles to the abscissas 32 and 33. The ramp 30 rises over the abscissas 32 from the coordinate origin V and thus faces toward the tilt axis 34. A respective lever 38 mounted to the housing (not shown) for pivoting around a fulcrum 38*a* is prestressed by means of a compression spring 39 against a respective ramp 30. A runoff roller 40 is rotatably fastened to each of the levers 38. Each of the springs 39 is a compression spring and presses a respective one of the levers 38 to the runoff roller 40 against the ramp 30. The shift lever 35, pivoted with the casing 31 around the tilt axis 34, pivots the ramps 30 against the runoff roller 40 which is fixed to the lever 38 in the direction of movement of the ramps 30. The runoff roller 40 rises on the ramp 30, rolling on the ramp 30.

REFERENCE NUMBERS

1 support arrangement
2 shift lever
2*a* shift
2*b* mid-axis
2*c* shift knob
3 housing
4 selector shaft
4*a* engagement groove
4*b* slot
5 selector shaft
5*a* engagement groove
6 selector shaft
6*a* engagement groove
7 selector shaft
7*a* engagement groove
8 pivot stud
9 pivot stud
9*a* tilt axis
10 casing
10*a* support eyelet
10*b* support eyelet
10*c* wall
10*d* opening
10*e* bushing
11 stop
11 slotted hole
11 stop
11*a* slotted hole
12 locking finger
12*a* clearance
13 plain bearing
14 slotted hole
15 latch contour
15*a* latch depression
15*b* latch depression
15*c* latch depression
16 latch element
17 roller
17*a* bolt
18 pivot lever
18*a* pivot point
18*b* bolt
18*c* end
18*d* end
19 projection
20 spring
21 ramp
22 spring
23 runoff roller
24 lever
24*a* fulcrum
25 metal sheet
26 abscissa
27 abscissa
28 ordinate
29 support arrangement
30 ramp
31 casing
32 abscissa
33 abscissa
34 tilt axis
35 shift lever
36 pivot axis
37 ordinate
38 lever
39 spring
40 runoff roller

The invention claimed is:

1. Support arrangement (1, 29) for pivotable mounting of a shift lever (2, 35) by a casing (10, 31) in a housing (3); wherein the support arrangement (1, 29) supports the shift lever (2, 35) in the casing (10, 31) pivotably with respect to the casing (10, 31) around a pivot axis (8*a*, 36) and also supports the shift lever (2, 35) with the casing (10, 31) pivotably with respect to the housing (3) around a tilt axis (9*a*, 34) aligned transversely of the pivot axis (8*a*, 36); and wherein the shift lever (2, 35) has at a free end a shift finger (2*a*), pivotable around the tilt axis (9*a*, 34) and also the pivot axis (8*a*, 36), wherein the tilt axis (9*a*, 34) and the pivot axis (8*a*, 36) are mutually spaced apart wherein the support arrangement (1, 29) has on the casing (10, 31) at least one slotted hole (11); the slotted hole (11) extends in a pivoting direction of the shift lever (2, 25) pivotable around the pivot axis (8a, 36); and wherein a stop (11a) protruding from the shift lever (2, 35) engages in the slotted hole (11); wherein the stop (11a) is spaced apart from the pivot axis (9a, 36); and wherein the stop (11a) in the slotted hole (11) limits a pivoting angle of the shift lever (2, 35) pivoting around the pivot axis (8a, 36); and wherein at least one first selector shaft (4, 5, 6, 7) and a second selector shaft (4, 5, 6, 7) are allocated to the shift finger (2a, 35), the shift finger (2a) pivoted around the tilt axis (9a, 34) positively engages, movable selectively, in one of the selector shafts (4, 5, 6, 7) and wherein the selector shaft (4, 5, 6, 7) in which the shift finger (2a) engages is longitudinally displaceable in at last one direction by the shift finger (2a) pivoting around the pivot axis (8a, 36).

2. Support arrangement according to claims 1, wherein the pivot axis (8a, 36) is situated nearer to the shift finger (2a) in comparison to the position of the tilt axis (9a, 34).

3. Support arrangement according to claim 1, wherein the shift lever (2, 35) is supported between a first wall and a second wall opposed to the first wall of the casing (10, 31) with a pivot stud (8) having the pivot axis (9a, 34), at least one of the walls having a support eyelet (10a) for supporting the pivot stud (8).

4. Support arrangement according to claim 1, wherein the casing (10, 31) is pivotably mounted on the housing (3) by two opposed pivot studs (9), wherein the mid-axes of the pivot studs (9) and the tilt axis (9a) coincide, and wherein the pivot studs (9a) engage in support eyelets (10b) on the casing (10, 31).

5. Support arrangement according to claim 4, wherein the pivot studs are received non-rotatably in the housing (3); the casing (10,31) is pivotable around the pivot stud (9); and a plain bearing (18) is arranged in each of the support eyelets (10b) between one of the pivot studs (9) and the casing (10, 31).

6. Support arrangement according to claim 1, wherein the support arrangement (1, 29) has at least a second slotted hole (14) on the casing (10, 31); the second slotted hole (14) extends in the pivoting direction of the shift lever (2, 35) pivotable around the tilt axis (9a, 34); and a second stop protruding from the housing (3) engages in the second slotted hole; the second stop is spaced apart from the tilt axis (9a, 34); and the second stop limits the pivoting angle of the shift lever (2, 35) pivoting around the tilt axis (9a, 34).

7. Support arrangement according to claim 1, wherein in the support arrangement (1, 29) a latch contour (15) with at least a first latch depression (15a, 15b, 15c) and a second latch depression (15a, 15b, 15c) is provided on the shift lever (2, 35); and wherein in the support arrangement (1, 29) a latch element (16) is prestressed against the latch contour (16), wherein the latch element (16) engages in the first latch depression (15a, 15b, 15c) upon pivoting movements of the shift lever (2, 35) around the tilt ads (9a, 34); and wherein the latch contour (15) is moved, by the shift lever (2, 35) pivoting around the pivot axis (8a, 36), on the latch element (16) until the latch element (16) is latched in the second latch depression (15a, 15b, 15c).

8. Support arrangement according to claim 7, wherein the latch contour (15) is immovably mounted on the shift lever (2, 35); and wherein the latch element (15) is guided on the casing (10, 31).

9. Support arrangement according to claim 8, wherein the latch element (15) is a rotatable roller (17) on a pivot lever (18), the pivot lever (18) being fastened to the casing (10, 31), pivotably around at least one pivot point (18a) and prestressed against the latch contour (15) with at least one spring (20) supported on the casing (10, 31) and engaging the pivot lever (18) remote from the pivot point (18a); and wherein the pivot axis of the pivot lever (18) running through the tilt point (18a) and the rotation axis if the roller (17) are aligned parallel to the pivot axis (8a, 36) of the shift lever (2, 35).

10. Support arrangement according to claim 9, wherein a projection (19) protrudes on the casing (10, 31) aligned in the same direction as the tilt axis (9a, 34) of the casing (10, 31) and points away from the rotation axis of the roller (17); the pivot lever (18) is made of sheet metal and is mounted, pivotably about the pivot point (18a), on the projection (19) by means of a bolt (18b); and wherein the pivot lever (18) has a hook-shaped end (18c); the hook-shaped end (18c) at least partially engages behind the projection (19) on a side remote from the pivot lever (18), axially securing the pivot lever(18) on the projection (19).

11. Support arrangement according to claim 9, wherein the pivot lever (18) is made of sheet metal and the roller (17) is mounted, movable around the rotation axis, on the pivot lever (18) by a bolt (17a); wherein the pivot lever (18) has a hook-shaped end (18d); and wherein the hook-shaped end (18d) at least partially engages behind the roller (17) at a side remote from the pivot lever (18), securing the roller (17) on the pivot lever (18).

12. Support arrangement according to claim 9, wherein the roller (17) is prestressed against the latch contour (15) by means of a tension spring (20) pulling the pivot lever (18) in the direction of the pivot axis (8a, 36).

13. Support arrangement according to claim 12, wherein the tension spring (20) has a spring end inset in the casing (10, 31), and is guided in a bushing (10e) with respect to the casing (10, 31).

14. Support arrangement according to claim 8, wherein the latch contour (15) is formed on a metal sheet standing out from the shift lever (2), the metal sheet engaging through a wall (10c) of the casing (10, 31) through which the which the pivot axis (9a, 34) passes, at an aperture (10d) of the wall, so that the latch contour (15) can be acted on by a roller (17) on an outside of the casing (10, 31); and wherein the latch contour (15) is provided with latch depressions (15a, 15b, 15c) aligned one behind the other transversely of the pivot axis (8a, 36) of the shift lever (2, 35) and adjoining one another.

15. Support arrangement according to claim 1, wherein the support arrangement (1, 29) has a device for increasing selection forces, the device comprising at least one ramp (21, 30) fixed to the casing and at least one runoff roller (23, 40) prestressed against the ramp (21, 30) by at least one spring (22, 38); wherein the ramp (21, 30) pivots with the casing (10, 31) upon pivoting movements of the shift lever (2, 35) around the tilt axis and the runoff roller (23, 40) supported on the housing (3) then rolls on the ramp (21, 30).

16. Support arrangement according to claim 15, wherein the ramp (21, 30) rises over at least one imaginary abscissa (26, 27, 32, 33) extending transversely from an imaginary plane, the plane running with the tilt axis (9a, 34) and thus also has the pivot axis (8a, 36) passing through it at right angles; and wherein the ramp (21, 30) extends rising away from the plane over the abscissa (26, 27, 32, 33), whereby the runoff roller (23, 40), with the shift lever (2, 35) pivoted around the tilt axis (9a, 36), rises on the ramp against the force of the spring (22, 39).

17. Support arrangement according to claim 16, wherein the ordinate (28) describing the course of the ramp (21) extends with the plane parallel to the tilt axis (9a).

18. Support arrangement according to claim 17, wherein the runoff roller (23) is rotatably fastened to a lever (24), the lever being pivotable around a pivot point (24a) fixed to the housing (3) and being prestressed against the ramp (21) by the runoff roller (23) with the at least one spring (22) engaging on the lever (24) remote from the pivot point (24a); and wherein the rotation axis of the runoff roller (23) is aligned transversely of the tilt axis (9a) of the shift lever (2).

19. Support arrangement according to claim 18, wherein the at least one ramp comprises two ramps (21) that are arranged on the casing (10), and another lever (24) with another runoff roller (23) is provided so that there are two of the levers (24), wherein a respective one of the levers (24) acts with respectively one of the runoff rollers (23) acts on each of the ramps (21); the levers (24), taking the casing (10) with the ramps (21) between them, are prestressed against one another by at least one tension spring (22); and wherein the tension spring (22) is inset respectively in a free end remote from the pivot point (24a) of each one of the levers (24).

20. Support arrangement according to claim 18, wherein the ramp (21, 30) rises, starting from a coordinate origin situated in the plane, over a first abscissa (26, 27, 32, 33) and also over a second abscissa (26, 27, 32, 33) directed oppositely to the first abscissa (26, 27, 32, 33), on both sides away from the plane; the ramp (21, 30) holding the shift lever (2, 35) in a neutral position via the runoff roller (23, 40) centered on the ramp (21, 30) at the coordinate origin; and wherein the ramp (21, 30) initially has a shallow rise from the coordinate origin over the first abscissa (26, 33) and also has a shallow rise over the second abscissa (27, 32); the ramp (21, 30) in its further course over the second abscissa (27, 32) adjoining the shallow rising ramp (21, 20) rises bending away from the second abscissa (27, 32) and finally runs out shallow; and wherein the runoff roller (23, 40) rolls on the shallow rising ramp (21, 30) when the shift lever (2, 35) pivots from the neutral position selectively in a pivot direction, and also encounters the bent-away rising ramp (21, 20) when the shift lever (2, 35) pivots around the tilt axis (9a, 34) on the second abscissa (27, 32).

21. Support arrangement according to claim 16, wherein the ordinate (37) describing a course of the ramp runs in the plane, aligned perpendicularly to the tilt axis (34).

22. Support arrangement according to claim 21, wherein the runoff roller (40) is rotatably fastened to a lever (38), the lever (38) being pivotable around a pivot point (38a) fixed to the housing (3) and being prestressed against the ramp (30) over the runoff roller (40) by at least one spring (39) engaging on the lever (38) remote from the pivot point (38a); and wherein the rotation axis of the lever (38) running through the pivot point (38a) and the rotation axis of the runoff roller (40) are aligned parallel to the tilt axis (34) of the shift lever (35).

23. Support arrangement according to claim 22, wherein the at least one ramp (30) comprises a plurality of ramps (30) that are arranged on the casing (31) and the lever (38) with the runoff roller (40) comprises a plurality of levers (38) with associated runoff rollers (40) rotatably fastened thereon; and wherein a respective one of the levers (38) acts on each of the ramps (30) with a respective one of the runoff rollers (40); wherein each of the levers (38) is prestressed against the ramp (30) over one of the runoff rollers (40) by respectively at least one spring (39).

24. Support arrangement according to claim 22, wherein the ramp (21, 30) rises, starting from a coordinate origin situated in a plane, over a first abscissa (26, 27, 32, 33) and also over a second abscissa (26, 27, 32, 33) directed oppositely to the first abscissa (26, 27, 32, 33), on both sides away from the plane; the ramp (21, 30) holding the shift lever (2, 35) in a neutral position via the runoff roller (23, 40) centered on the ramp (21, 30) at the coordinate origin; and wherein the ramp (21, 30) initially has a shallow rise from the coordinate origin over the first abscissa (26, 33) and also has a shallow rise over the second abscissa (27, 32); the ramp (21, 30) in its further course over the second abscissa (27, 32) adjoining the shallow rising ramp (21, 20) rises bending away from the second abscissa (27, 32) and finally runs out shallow; and wherein the runoff roller (23, 40) rolls on the shallow rising ramp (21, 30) when the shift lever (2, 35) pivots from the neutral position selectively in a pivot direction, and also encounters the bent-away rising ramp (21, 20) when the shift lever (2, 35) pivots around the tilt axis (9a, 34) on the second abscissa (27, 32).

25. Support arrangement according to claim 1, wherein each of the selector shafts (4, 5, 6, 7) is provided with a slot (4b) open in the direction of the casing (10, 31) and also in the pivoting directions of the shift lever (2, 35) pivoted around the tilt axis (9a, 34); and wherein a locking member formed on the support arrangement (1, 29) engages selectively in the slot (4b) for selectively fixing at least one of the selector shafts (4, 5, 6, 7).

26. Support arrangement according to claim 25, wherein the locking member is a locking finger (12) fixed on the casing (10, 31) and also extending from the casing (10, 31) and thus positively engaging at least in one of the slots (4b); wherein the first selector shaft (4, 5, 6, 7) is longitudinally fixed by means of the locking finger (12) with respect to the second selector shaft (4, 5, 6, 7) when the shift finger (2a), pivoted around the tilt axis (9a, 34), movably engages positively into the second selector shaft (4, 5, 6, 7); and wherein the second selector shaft (4, 5, 6, 7) is longitudinally fixed by means of the locking finger (12) with respect to the first selector shaft (4, 5, 6, 7) when the shift finger (2a) pivoted around the tilt axis (9, 34) movably engages positively into the first selector shaft (4, 5, 6, 7); and wherein the locking finger (12), pivoting with the casing (10, 31) around the tilt axis (9a, 34) within the slots (4b) situated one behind the other in the pivoting direction of the locking finger (12) and aligned to one another, is pivotable until the shift finger (2a) positively engages in one of the selected longitudinally movable selector shafts (4, 5, 6, 7) and also the locking finger (12) positively engages in the slot of at least one selector shaft (4, 5, 6, 7) to be fixed.

27. Support arrangement according to claim 26, wherein at least three of the selector shafts (4, 5, 6, 7) are allocated to the shift finger (2a), the locking finger (12) in two of the selector shafts (4, 5, 6, 7) simultaneously and the shift finger (2a) positively engaging in one of the selector shafts (4, 5, 6, 7) longitudinally movable by means of the shift finger (2a); and wherein the locking finger (12) has a clearance (12a) interrupting the locking finger (12) in the pivoting direction of the lacking finger (12) and located over the slot (4b) of the freely longitudinally movable selector shaft (4, 5, 6, 7) upon fixing two selector shafts (4, 5, 6, 7) immediately adjacent to the longitudinally freely movable selector shaft (4, 5, 6, 7); and wherein the selector shaft (4, 5, 6, 7) movable with the shift finger (2a) passes through the locking finger (12) at the clearance (12a) without contact with the locking finger (12).

* * * * *